Patented Mar. 22, 1927.

1,621,793

UNITED STATES PATENT OFFICE.

PAUL W. KRUGER, OF ATTALA COUNTY, MISSISSIPPI.

COMPOSITION OF MATTER FOR CAPPING PULPS IN TEETH AND IMPROVEMENTS IN DENTAL FILLING MATERIALS.

No Drawing. Application filed August 11, 1924. Serial No. 731,489.

My invention relates to improvement in compositions of matter for capping live, exposed pulps particularly and for other dental filling purposes in cavities in teeth.

The object of my invention is the production of a composition of matter for conveniently applying to the surface of a cavity in a tooth or to cap the tooth-pulp with waxy material or wax without the necessity of application of heat or use of solvents.

Furthermore, an object is to provide in such a composition germicidal or other additional requisites for sterilization or treatment of the cavity surface or surrounding tissue.

My composition though placed at once in a tooth cavity, in its composition form, and conveniently so, without application of heat or use of volatile solvents, and though confined at once as part of a permanent restoration under the superimposed or external filling that may be completed to full restoration at once, supplies a coating of waxy material or wax, formed into coalescent continuity gradually, in situ. Germicidal or medicinal action continues during the formation of the coating into coalesced structure as diffusion of the fluid or germicidal ingredients from the confined composition occurs into surrounding tissue or partially into superimposed cement. A germicidal preliminary treatment is not necessary as in the case of waxes applied with heat.

I accomplish an object of my invention of forming a continuous coating of such substances in a tooth cavity in the following way which describes the composition and explains the principle thereof. If a wax or other cohesive material of coalescing property, or a solid wax such as bees-wax or paraffine wax or similar wax is made into a finely divided form and is left lie with the particles in contact for a length of time at ordinary atmospheric temperature, the particles in direct contact will gradually in time coalesce by cohesion and form a mass of continuity of structure or of solidity of form of the substance, or essentially so. The coalescing tendency is increased at a temperature corresponding to the human body temperature as in a tooth cavity.

My invention is a composition of matter containing a wax or a material of coalescing property, or preferably a hard or solid wax or waxy acting material in finely divided or loose form, kept from coalescing and kept separated in finely divided or loose form by an appropriate material suitable for dental uses, or by an appropriate medicinal or germicidal fluid which may diffuse into human tissue when placed in a tooth cavity, mixed with it in such a way as to hold the particles of said wax or waxy material from coalescing or keep the composition in its form of fluidity. Such separating material or substances must necessarily be of a kind that do not dissolve the waxy or other coalescing substance or at least that do not dissolve it to an extent that appreciably alters the working of the composition. The words "non-solvent" herein in the specification and claims are meant as covering liquids or fluids within these workable limitations.

As a matter of choice for the waxy substance, I use paraffine wax as it is a wax particularly adapted to permanent contact with live human tissue, and I prefer to use the solid wax, that has a melting point around fifty degrees centigrade, on account of readily coalescing into continuity of form when particles or surfaces of the wax lie in direct contact at human body temperature For the material to separate the finely divided waxy substance or hold its surfaces from coalescing, I use for a purpose of disinfection, antiseptic and medicinal action an appropriate germicidal fluid or germicidal substances in which the finely divided, waxy substance does not dissolve and with which it is kept from coalescing. As an appropriate germicidal fluid of the composition any appropriate germicidal fluid suitable for the dental uses may be used either alone or with other germicides or medicinal substances but I use by choice guaiacol as the particular or principal germicidal liquid ingredient. With it I prefer to mix in solution an anesthetic germicidal compound or anesthetic compound of mild action, preferably an oxyacetic acid compound of guaiacol, or a glycolate, in mixture with the guaiacol, producing at the same time the combination of an efficient anesthetic and a therapeutic germicide, a combination therapeutically mild, antiseptic and anesthetic. Dissolved or mixed with the guaiacol, I prefer to use a glycolic acid ester of guaiacol, such as methyglycolic acid ester of guaiacol, ethylglycolic acid ester of guaiacol, or other allied compound of guaiacol of milder action than the guaiacol. For additional germicidal effect I use also helenin. The solid helenin I dissolve in the germicidal fluid but other suitable soluble, solid or relatively insoluble germicides or antiseptic or medicinal substances may be introduced in the composition in small or appropriate percentage or within limits of not interfering with the essential ultimate coalescence of the wax within such limitations as expressed to follow as to bulk, essentially chemically inert, medicinal, soluble, germicidal or relatively insoluble substances, the kind of substances whether organic or inorganic, germicidal or medicinal, depending according to choice upon the purposes for which the composition is used in the tooth cavity. A preferred proportion of particular ingredients for the germicidal fluid of the composition is equal parts of guaiacol and guaiacol methylglycolate with addition of one percent of helenin dissolved therein.

I can make the composition as follows: The paraffine I bring into finely divided form by agitation while hot or in semi-congealed or melted condition, with a suitable, non-solvent fluid such as the above, and continue to agitate during the time that the mixture is cooling. This may be done directly in a mortar with a pestle, the working being continued until the composition is at the temperature of the atmosphere or nearly so and the wax is finely divided in suspension or mixture with the fluid in a pasty form of composition. For very finely divided wax a proportion of germicidal fluid content within a range of thirty-five to fifty percent by weight of the total composition generally gives the preferred working consistency.

To give greater rigidity of structure, I prefer to use in composition solid substances in powder form, or chemically inert substances, chemically inert in so far as is essential to be suitable for dental uses, or other suitable substances in powder form such as calcium phosphate, infusorial earth, or a magnesium silicate, or other harmless, solid, beneficial or medicinal substances. With the above particular germicidal fluid stated in definite proportions I can use as an appropriate material for a solid substance in powder form for bulk purpose, a magnesium silicate. The solid ingredients in powder form may be incorporated in the composition directly by mixing. The amount of loose powder introduced should preferably be, in volume of the loose powder, not more than one and one half times the volume of the space occupied by the wax in melted liquid form. More wax will be best for readily coalescing.

A better composition containing the solid ingredients introduced in powder form, I can produce in the following way whereby a composition is formed having better coalescing tendency of the wax to form continuity or homogeneity and rigidity of structure. The solid substance or substances in powder form are first permeated and amply coated with the wax or waxy substance before separation into the finely divided form with the fluid into the composition form, that is, when using a bulk or other introduced powder permissible or desirable to coat, I prefer to coat the powder with melted wax or paraffine and then while in soft condition, add the germicidal fluid to work up with it into the composition form of fine division into a paste consistency. The minimum amount of wax or paraffine to use is preferably not less than would be required to fill the interstices of the bulk or introduced powder in the wax volume of intervening spaces and is approximately determined by ordinary calculation or by physical means. I prefer to use a quantity of wax or other coalescing coating substance above this minimum for certainty of good coalescing tendency.

It is desirable that the wax coated powder be sufficiently cooled to have reached the congealing point or just a little below the melting point, before adding the germicidal fluid which should likewise be of a temperature at or below the melting point of the particular wax used when it is added to the wax coated powder. If the paraffine wax permeating the powder is in hot, melted, very freely flowing condition when the germicidal fluid is added, or if the fluid is at a temperature much above the melting point of the wax when it is added in preparation of the composition, there is a tendency of the wax being replaced by the germicidal fluid taking its place in working the composition together and the paraffine is separated more or less as individual particles. The powder is then not as thoroughly coated as desired and the composition would revert then mainly or partly to a form of simple mixture.

A specific composition I can make as follows: I take thirty parts by weight of paraffine wax and heat to melt and while in melted, hot and freely flowing condition, add twenty-two parts by weight of a magnesium silicate powder and thoroughly work together so that the powder is thoroughly permeated with the wax. The germicidal fluid containing guaiacol, guaiacol methylglycolate and helenin in the proportions described herein above, is brought to the temperature of the melting point of the wax or a little below that temperature, and as soon as the mixture of wax coated powder has cooled sufficiently to just start to congeal, forty-eight parts by weight of the germicidal liquid is added and thoroughly incorporated by agitation or by mortar and pestle. Variations in the proportions from the above may be used, less germicidal fluid used if thicker pasty composition is wanted or if too thick, correspondingly more fluid added from time to time and incorporated by working together in a mortar with a pestle until a desired or a preferred consistency for ease of working and purposes of use is obtained, which is a matter of observation in gradually adding a little more liquid from time to time and working up into a preferred consistency. Other powders of medicinal or physiological effect may be worked in at the same time or such powders may be contained in the original wax coated powder whereby their physiological action or any chemical activity with the fluid ingredients of the composition may be restricted, if so desired, according to the thoroughness of the coating of the wax on the particles of the powder.

Having thus described and disclosed my invention, I claim as new and desire to secure by Letters Patent:—

1. A composition of matter for filling in cavities in teeth, comprising paraffine in loose form, a silicate powder, and guaiacol.

2. A composition of matter for filling in cavities in teeth, comprising paraffine in loose form, a magnesium silicate and a germicidal fluid suitable for dental uses, containing a guaiacol glycolate.

3. A composition of matter for filling in cavities in teeth, comprising a magnesium silicate powder coated with paraffine, and a germicidal fluid suitable for dental uses whose principal liquid germicidal ingredient is guaiacol, containing guaiacol methylglycolate dissolved in the germicidal fluid.

In testimony whereof I have hereunto affixed my signature.

Post Office: Sallis, Mississippi.

PAUL W. KRUGER.